O. F. GREIM.
FOUL GAS VALVE.
APPLICATION FILED OCT. 5, 1908.
948,049.
Patented Feb. 1, 1910.
2 SHEETS—SHEET 1.
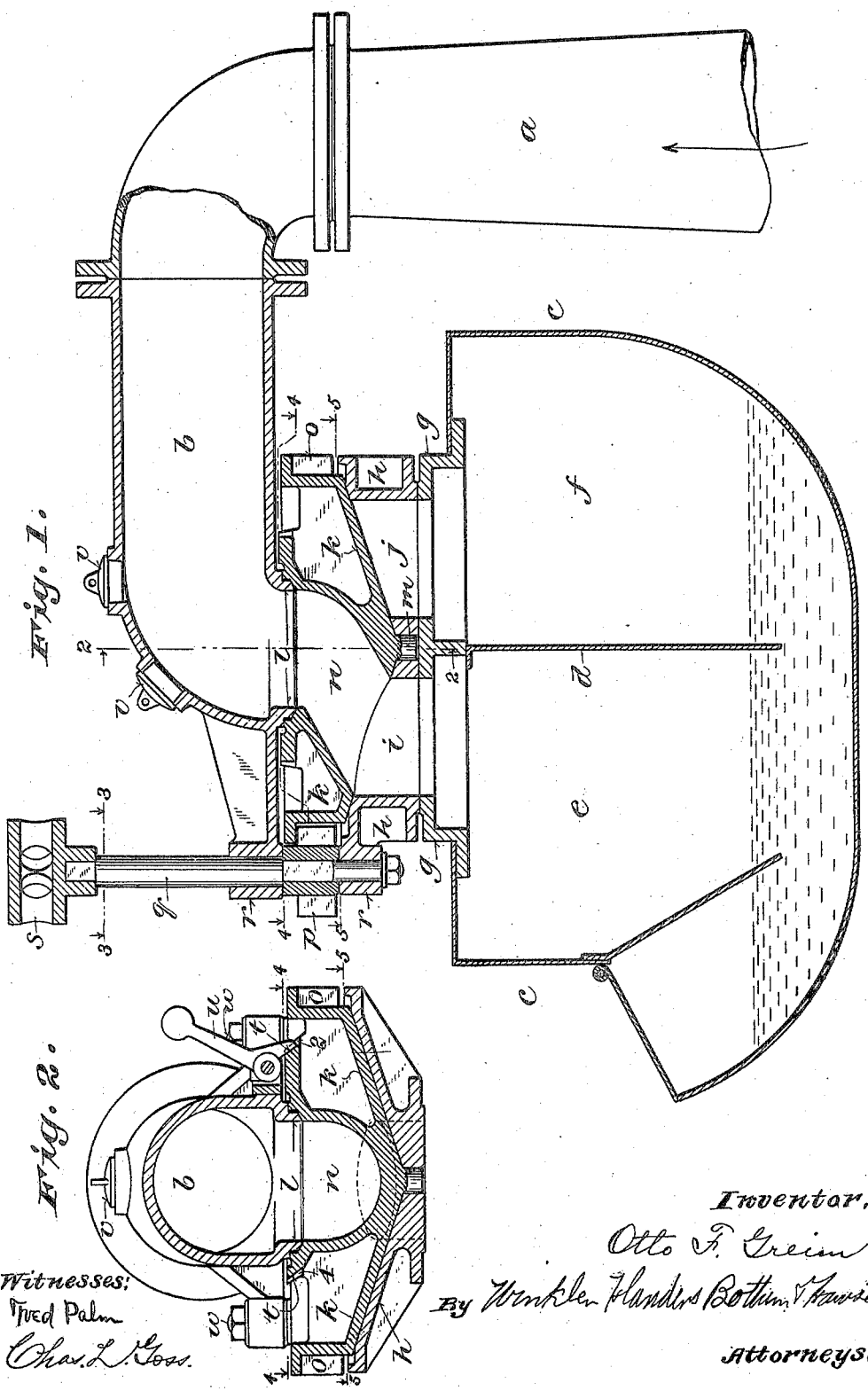

O. F. GREIM.
FOUL GAS VALVE.
APPLICATION FILED OCT. 5, 1908.

948,049.

Patented Feb. 1, 1910.
2 SHEETS—SHEET 2.

Witnesses:
Fred Palm
Chas. L. Toss.

Inventor:
Otto F. Greim
By Winkler Flanders Bottum & Fawsett
Attorneys.

UNITED STATES PATENT OFFICE.

OTTO F. GREIM, OF MILWAUKEE, WISCONSIN, ASSIGNOR TO THE MILWAUKEE COKE AND GAS COMPANY, OF MILWAUKEE, WISCONSIN, A CORPORATION OF WISCONSIN.

FOUL-GAS VALVE.

948,049.   Specification of Letters Patent.   Patented Feb. 1, 1910.

Application filed October 5, 1908. Serial No. 456,140.

*To all whom it may concern:*

Be it known that I, OTTO F. GREIM, a citizen of the United States, residing at Milwaukee, in the county of Milwaukee and State of Wisconsin, have invented certain new and useful Improvements in Foul-Gas Valves, of which the following is a specification, reference being had to the accompanying drawing, forming a part thereof.

This invention relates more particularly to valves for controlling the passage of gas from the retorts or ovens of gas or coke plants to the collecting or so called "hydraulic" mains. Its main objects are to prevent the leaking and sticking of valves of this class, and generally to improve their construction and operation.

The invention consists in certain novel features of construction and in the peculiar arrangement and combination of parts as hereinafter particularly described and pointed out in the claims.

In the accompanying drawing like characters designate the same parts in the several figures.

Figure 3:
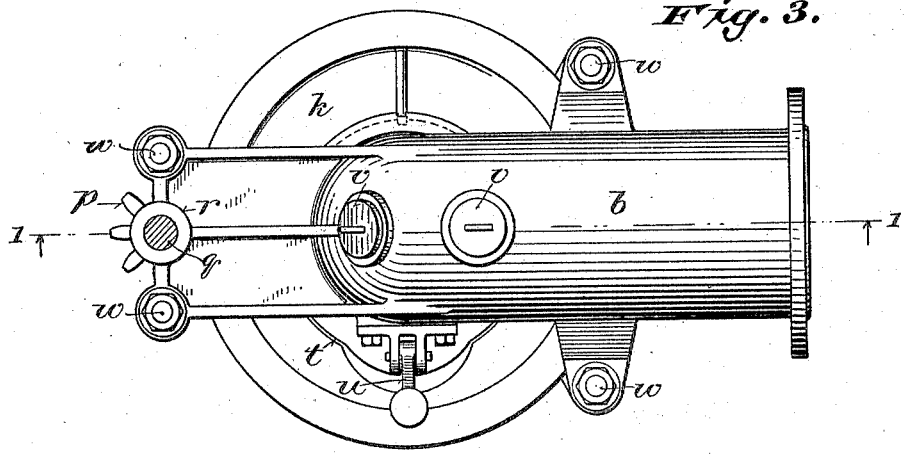
Figure 4:
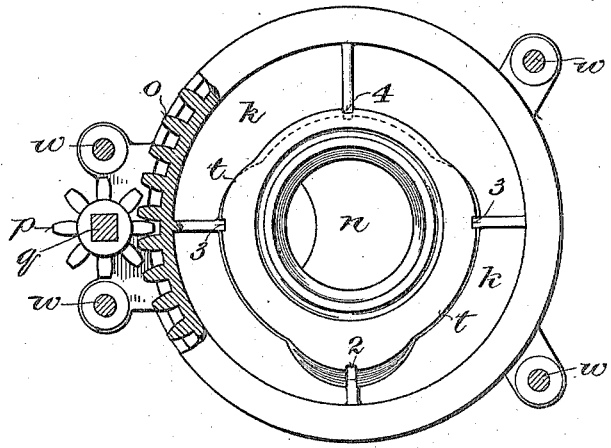
Figure 5:
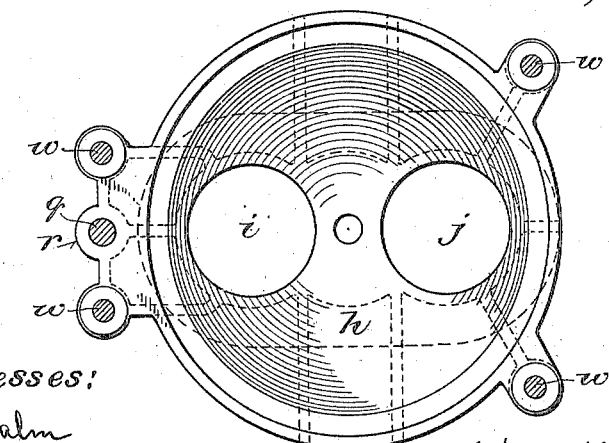

Figure 1 is a vertical medial section on the line 1 1, Fig. 3, of a valve and associated parts embodying the invention; Fig. 2 is a vertical cross section on the line 2 2, Fig. 1; Fig. 3 is a plan view, the pinion shaft being shown in cross section on the line 3 3, Fig. 1; Fig. 4 is a plan view and section on the line 4 4, Fig. 1 of the disk valve and operating pinion; and Fig. 5 is a section and plan view of the valve seat on the line 5 5, Fig. 1.

In coke and gas plants the gas generated from coal is conducted by pipes from the ovens or retorts into collecting or so called "hydraulic" mains which are usually or frequently divided into separate passages or conduits for rich and lean gas, the supply of gas to said passages or conduits being controlled by valves by which it is cut off entirely from the mains or directed according to its quality or richness into the proper passages or conduits.

The gas as it comes from the ovens or retorts contains impurities which are deposited upon the controlling valves and their seats as they are usually constructed and arranged causing the valves to leak and thereby preventing the proper separation of the rich from the lean gas besides causing them to stick and work hard on account of the deposit and incrustation of such impurities on the working faces of the valves and their seats.

To avoid these difficulties and to attain the objects above stated is the purpose of the construction and arrangement of parts herein shown and described.

Referring to the drawing, $a$ designates a stand pipe such as are commonly provided on coke ovens for conducting off the gas generated therein.

$b$ is a bridge pipe leading horizontally from the upper end of the stand pipe to a collecting or so called "hydraulic" main $c$, which in the present case according to common practice, is divided by a partition $d$ into two passages $e$ and $f$, for lean and rich gas respectively.

Upon the top of the main $c$ is mounted a base plate $g$, and upon this plate is fitted and secured a valve seat $h$ having two ports $i$ and $j$ which communicate through registering openings in the base plate with the passages $e$ and $f$ respectively.

Between the seat and the overhanging end of the bridge or supply pipe $b$ is interposed a rotary disk valve $k$, preferably formed on the under side with a conical working face fitted to a corresponding face on the upper side of the seat $h$. The overhanging end of the pipe $b$ is formed on the under side with an opening and a surrounding lip or flange $l$, which fits into a corresponding recess in the upper face of the valve disk concentric with its axis and forms therewith a gas tight joint. On the under side the valve disk is formed or provided with a stem or stud $m$ which is fitted to turn in a central socket in the seat $h$. A port or passage $n$ extends obliquely through the valve disk, registering at its upper end with the opening in the pipe $b$, and opening through the conical or under face of the disk eccentric to its axis so as to be turned into and out of register with either of the ports $i$ and $j$ and to open and close communication between the supply pipe $b$ and either of the passages $e$ and $f$ in the collecting main.

To facilitate turning the valve, it is formed or provided on its periphery with gear teeth $o$, which mesh with a pinion $p$ on a vertical shaft $q$ which is supported in bearings $r$ formed therefor on the pipe $b$ and seat $h$. At its upper end the shaft $q$ is provided with a head s having a series of radial holes to receive a rod or bar for turning the pinion and valve.

To lock and hold the disk valve in its different positions and to determine and indicate such positions, the valve disk is formed or provided on the upper side as clearly shown in Fig. 4, with a rim $t$ of varying radius, having notches 2, 3 and 4 arranged at intervals therein and at different distances from the axis of the valve, and a gravity detent consisting of a weighted angular lever $u$, is pivoted to the pipe $b$ so that its shorter depending arm will ride upon the rim $t$ and automatically drop into said notches when they are turned into the proper position. The notch 2 is arranged to lock and hold the valve with its port $n$ in register with the port $i$, and the notch 4 is arranged to lock and hold it with the port $n$ in register with the port $j$. When the detent is in engagement with the notch 2, which is farthest from the axis of the valve, the longer weighted arm of the detent will stand as shown in Fig. 2, in an approximately upright position, thus indicating that communication is established between the pipe $b$ and the passage $e$ of the collecting main. When the detent is in engagement with the notch 4, which is nearest the axis of the valve, its longer weighted arm will stand in an approximately horizontal position, thus indicating that communication is established between the pipe $b$ and the passage $f$. When the detent engages with either of the notches 3, which are equidistant from the axis of the valve, its longer arm will stand in an intermediate position, thus indicating that both ports $i$ and $j$ are closed and communication between the pipe $b$ and the collecting main $c$ is completely cut off.

The bridge pipe $b$ is formed with clean out openings above and approximately in line with the ports $i$ and $j$ for the purpose of inserting an instrument to clean them out in case they become clogged with soot, these openings being ordinarily closed by plugs $v$.

The several parts of the device when assembled are secured and held in the proper relation to one another by bolts $w$.

In the operation of the device, when rich gas is supplied from the oven or retort, the valve $k$ is set by the operator to deliver it into one of the passages, as for example, the passage $f$ of the collecting main, and when lean gas is supplied, the valve is turned to discharge it into the other passage $e$, thus keeping the two grades or qualities separate. When the oven or retort is being charged or discharged, or is not in operation, the valve is set to completely cut off communication between the pipe $b$ and the collecting main $c$.

It will be observed that with valve mechanism constructed and arranged as herein shown and described, when communication is established between an oven or retort and the collecting main $c$ and gas is flowing through the pipes $a$ and $b$, no surfaces or ledges are exposed in the passage through the valve for the deposit of soot or other impurities. When the valve is closed by turning the lower end of its port $n$ out of register with the ports $i$ and $j$ in the seat and there is no flow of gas through the pipe $b$, little or no soot or impurities will be deposited upon the face of the valve seat closing the lower end of the port $n$, but if there should be any such deposit or incrustation, the turning of the valve into another position will completely remove such deposit and discharge it through one of the ports $i$ and $j$ into the main $c$, which is trapped, and from which it may be readily removed. The valve is thus made self cleaning, and any deposit upon its seat when it is closed will be completely removed by the next adjustment of the valve, without causing leakage or other trouble.

A rod or bar inserted in the head $s$ of the pinion shaft, and the pinion $p$ meshing with the larger gear or rack around the periphery of the valve, afford sufficient leverage to easily start and turn the valve in case it should stick.

To unlock and shift the valve from one position to another, the longer arm of the detent $u$ is thrown back by the operator, thereby carrying its shorter arm out of the notch with which it engages. The valve is then turned by means of the pinion $t$ in one direction or the other till the notch is out of register with the detent, whereupon the latter is released and its shorter arm rides on the rim $t$ till another notch is brought into register with it. Dropping into this notch, the detent automatically determines the position of the valve and locks it in that position. In case the valve is to be turned a distance of 180 degrees to carry the port $n$ out of register with one of the ports $i$ and $j$ into register with the other, the detent is held out of operative position while the intermediate notch 3 passes it.

Various changes in the minor details of construction and arrangement of parts may be made without departing from the principle and scope of the invention.

I claim:

1. The combination with a gas supply pipe and a collecting main having two gas passages, a rotary disk valve interposed between said pipe and main, and a valve seat having ports eccentric to the axis of the valve and communicating respectively with the passages of the main, the valve having an oblique port communicating centrally on one side with said pipe and adapted to register on the other side with either port in the seat, substantially as described.

2. The combination with a gas supply pipe and a collecting main, of a rotary disk valve and a stationary seat therefor interposed between said pipe and main, the seat having a port eccentric to the axis of the valve and communicating with the main and the valve having a port adapted to communicate on one side with said pipe and to be turned into and out of register on the other side with the port in the seat and having gear teeth on its periphery and a pinion meshing with said gear teeth, said valve having a bearing concentric with its axis on said supply pipe, substantially as described.

3. The combination with a gas supply pipe and a collecting main, of a rotary disk valve and a stationary seat therefor interposed between said pipe and main, the seat having a port eccentric to the axis of the valve and communicating with the main, the valve having a port adapted to communicate on one side with said pipe and to be turned into and out of register on the other side with the port in the seat and having a notched rim, and a detent adapted by engagement with notches in said rim to indicate the open and closed positions of the valve and to automatically lock it in such positions, substantially as described.

4. The combination of a rotary disk valve having a toothed periphery, a notched rim and a port opening through one face eccentric to its axis, a valve seat having a port with which the eccentric opening of the valve port is adapted to be turned into and out of register, a pinion meshing with the toothed periphery of the valve and a detent adapted by engagement with notches in the rim of the valve to indicate its open and closed positions and to automatically lock it in such positions, substantially as described.

5. The combination of a rotary disk valve having a conical face and an oblique port opening through its conical face eccentric to its axis and through its other face concentric with its axis, a gas supply pipe communicating with the central port opening of the valve, said pipe and valve having an annular lip and a corresponding recess fitting one into the other and forming a gas tight joint and a bearing for the valve and a conical valve seat in which said valve is fitted having a port with which the valve port is adapted to be turned into and out of register substantially as described.

6. The combination with a gas supply pipe and a collecting main, of a rotary disk valve having a conical face and a port registering with an opening in said pipe concentric with the axis of the valve and opening through its conical face eccentric to its axis, and a conical seat in which the conical face of the valve is fitted having a port with which the valve port is adapted to be turned into and out of register and which communicates with said main, substantially as described.

7. The combination of a rotary disk valve having a conical face and a port passing through it obliquely to its axis and opening through one face eccentric to, and through the other face concentric with, its axis and a conical seat having a number of ports with each of which the eccentric opening of the valve port is adapted to be turned into and out of register, substantially as described.

8. The combination with a gas supply pipe and a collecting main having a number of passages, of a rotary disk valve having a conical face and a port passing through it obliquely to its axis and registering at one end with an opening in said pipe concentric with its axis, and a conical seat having ports which communicate respectively with the passages of said main and with each of which the other end of the valve port is adapted to be turned into and out of register, substantially as described.

9. The combination with a gas supply pipe and a collecting main, of a valve seat having a port communicating with said main and a rotary disk valve having a port passing through it obliquely to its axis, registering at one end with an opening in said pipe concentric with the axis of the valve and adapted to be turned into and out of register at the other end with the valve seat port which is eccentric to the axis of the valve, substantially as described.

10. The combination with a gas supply pipe and a collecting main having a number of passages, of a valve seat having ports communicating respectively with said passages, and a rotary disk valve having a port passing through it obliquely to its axis in constant register at one end with an opening in said pipe and adapted to be turned into and out of register at the other end with any of the valve-seat ports which are arranged eccentric to the axis of the valve, substantially as described.

In witness whereof I hereto affix my signature in presence of two witnesses.

OTTO F. GREIM.

Witnesses:
 CHAS. L. GOSS,
 ALICE E. GOSS.